(12) United States Patent
Inoue et al.

(10) Patent No.: US 6,928,557 B1
(45) Date of Patent: Aug. 9, 2005

(54) METHOD AND APPARATUS FOR EJECTING A RECORDING MEDIUM FROM A STORAGE UNIT DETACHABLE FROM HOST EQUIPMENT

(75) Inventors: Kazuhiko Inoue, Kawasaki (JP); Masahiro Ito, Higashine (JP); Masaaki Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,073

(22) Filed: Dec. 14, 1999

(30) Foreign Application Priority Data

| Dec. 14, 1998 | (JP) | 10-354608 |
| Dec. 2, 1999 | (JP) | 11-343474 |

(51) Int. Cl.⁷ .................... G06F 11/30; G06F 12/14; H04L 9/00; H04L 9/32; H04K 1/00
(52) U.S. Cl. .................... 713/202; 713/183; 360/99.06
(58) Field of Search .................... 360/69, 97, 98, 360/99; 713/202, 310–350; 318/116; 380/423–425, 20–25

(56) References Cited

U.S. PATENT DOCUMENTS

| 5,119,252 A | * | 6/1992 | Kamata et al. | 360/99.06 |
| 5,608,717 A | * | 3/1997 | Ito et al. | 369/275.3 |
| 5,715,487 A | * | 2/1998 | McIntyre et al. | 396/299 |
| 5,818,182 A | * | 10/1998 | Viswanadham et al. | 318/116 |
| 5,911,777 A | * | 6/1999 | Heredia | 713/200 |
| 5,944,832 A | * | 8/1999 | Jolley et al. | 813/300 |
| 6,012,832 A | * | 1/2000 | Saunders et al. | 235/375 |

FOREIGN PATENT DOCUMENTS

| EP | 000770997 A2 | * | 10/1996 | | G11B/19/02 |
| JP | 56-94556 | | 7/1981 | | |
| JP | 5-89295 | | 4/1993 | | |
| JP | 7-44273 | | 2/1995 | | |
| JP | 9-6493 | | 1/1997 | | |
| JP | 9-97126 | | 4/1997 | | |
| JP | 9-114546 | | 5/1997 | | |
| JP | 09114546 A | * | 5/1997 | | G06F/1/16 |

* cited by examiner

Primary Examiner—Gregory Morse
Assistant Examiner—Michael J. Simitoski
(74) Attorney, Agent, or Firm—Greer, Burns & Crain, Ltd.

(57) ABSTRACT

A detachable storage unit is connected to host equipment in a computer system and holds an ejectable storage medium. The storage unit has a connection detector that detects whether or not the storage unit is connected to the host equipment, and a storage medium detector that detects the presence of a storage medium within the storage unit. A medium ejection instructor sends a medium ejection instruction to an automatic medium ejection mechanism upon receiving information that indicates that the storage medium might be moved. The storage medium is then ejected from the storage unit which prevents damage caused by the storage medium colliding with internal components of the storage unit while the storage unit is being moved.

14 Claims, 16 Drawing Sheets

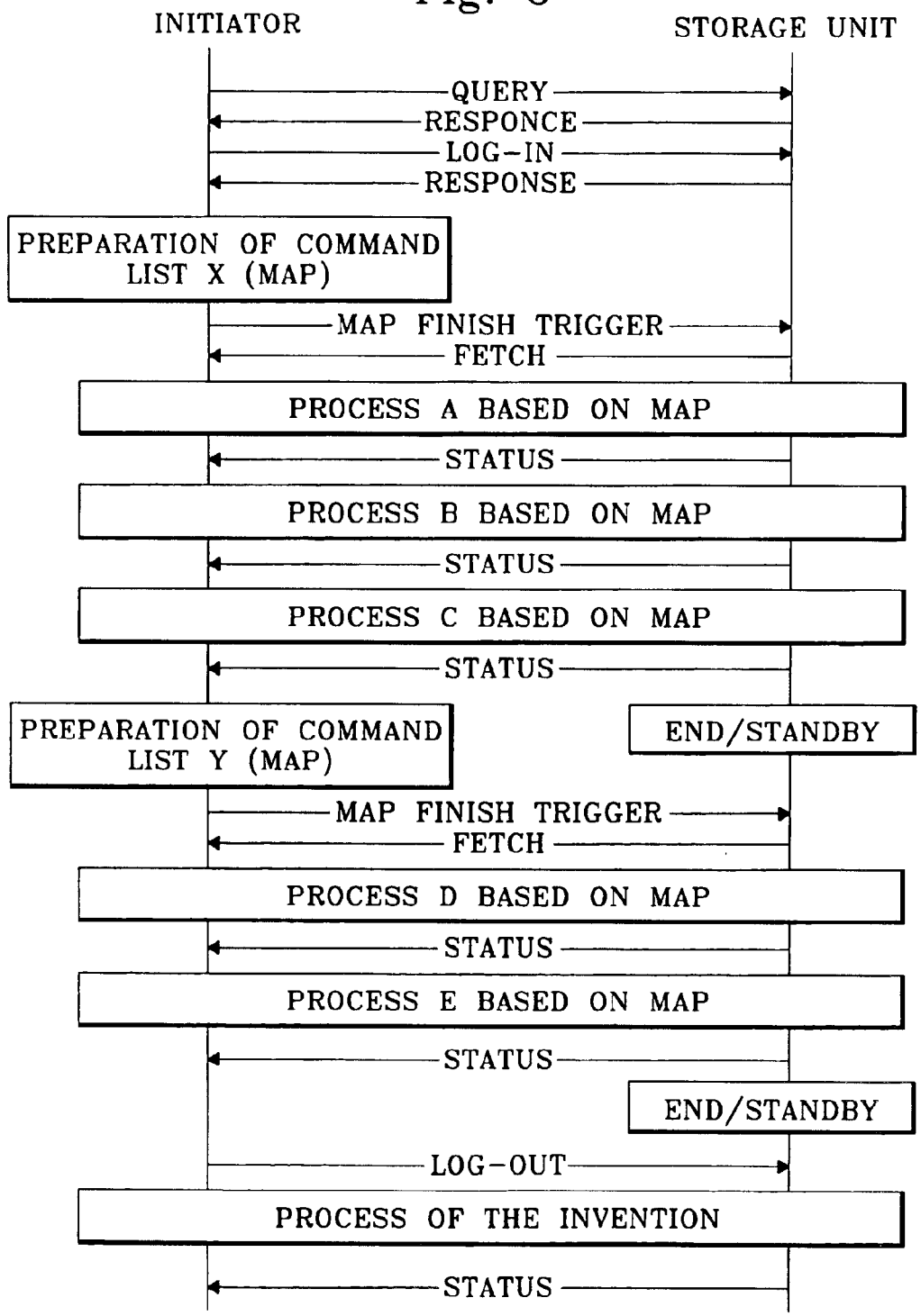

METHOD AND APPARATUS FOR EJECTING A RECORDING MEDIUM FROM A STORAGE UNIT DETACHABLE FROM HOST EQUIPMENT

BACKGROUND OF THE INVENTION

The present invention relates generally to peripheral equipment such as a storage unit that can be disconnected from host equipment in a computer system and can hold a storage medium. More specifically, the invention relates to a personal computer connected to a detachable storage unit, and to a method of ejecting a medium from the storage unit.

Computer technology is advancing in many fields, including home appliances, and from compact disks (CDs) to devices recording still pictures and video onto disks and tapes. Under such circumstances, an interface complying with IEEE 1394 standards (hereinafter written as "IEEE 1394") is drawing attention as a popular high-speed serial interface as a substitute for a SCSI (small computer system interface). IEEE 1394 connectors are a general purpose interface used to transfer digital data to and from a small computer, a storage medium (e.g., magnetic disk (HDD), magnetic-optic disk (MO), magnetic tape) and a printer for personal computers (hereinafter abbreviated as "PCs") and work stations. The IEEE 1394 interface is preferred because it can be used with multi-media applications which were impossible to use with the SCSI.

The use of the IEEE 1394 interface can be roughly divided into two fields of application: an interface for PC peripheral equipment and an interface in the field of home appliances (particularly, for AV (audio-visual) applications). The IEEE 1394 interface can be used to connect PCs to home appliances. The features of the IEEE 1394 interface can be summarized as follows:

(1) multi-media transfer (isochronous transfer) support;
(2) speed corresponding to dynamic pictures (cable versions, 800 Mbps, 1600 Mbps, 3200 Mbps);
(3) automatic configuration (plug-and-play);
(4) host PC is not always needed;
(5) use of a device bay rather than cable connections;
(6) peer-to-peer connections;
(7) hot plugging possible;
(8) topology (tree structure) with a high degree of freedom;
(9) termination unnecessary; and
(10) generally usable for packet communication.

Among these features, plug-and-play did not exist in conventional interfaces. When the power source plug is connected to an outlet for an IEEE 1394 interface, the equipment starts immediately and is ready for use, offering convenience. In addition, since hot plugging is possible, the user can connect or disconnect the cable while the PC is still running and does not have to restart the PC each time the cable to the peripheral is disconnected and connected.

The device bay is a new feature and includes a standard extension slot which greatly improves plug-and-play by facilitating the mechanical connection between the devices. With a device bay, it is possible to incorporate peripheral equipment in the PC without opening the housing of the PC or without turning off the power source of the PC. Thus, the user will find it more convenient to use. Various storage units can be inserted in the device bay including a hard disk unit.

However, whether the peripheral is connected to the PC by cable or device bay, the systems capable of disconnecting peripheral equipment without turning off the power of the host equipment, as with the IEEE 1394 interface, have a number of problems.

First, since the peripheral equipment has plug-and-play and hot plugging, it is easy to move peripheral equipment by disconnecting the power source plug and connection cables. A user may connect cables to peripheral equipment to store or read data or execute a particular job but may then disconnect the cables when the job is finished to transport the peripheral equipment to another place. Therefore, when a removable medium such as floppy disk or magneto-optic disk remains inserted in the peripheral equipment while transporting the peripheral equipment, the actuator mounting a read/write head may move due to vibration while transporting the peripheral equipment, whereby the head may collide with the medium, often causing damage to the peripheral equipment or the medium.

Second, the storage units that can be inserted in a device bay without opening the housing of the PC can be easily used, removed and even replaced without authorization. Currently, no measures exist to prevent unauthorized use or theft of these types of storage units.

OBJECTS OF THE INVENTION

Thus, it is an object of the present invention to provide an improved detachable storage unit that prevents damage to itself and a storage medium located in the storage unit by preventing collisions between components within the storage unit and the storage medium while the storage unit is being moved.

More specifically, an object of the present invention is to provide an improved storage unit that automatically ejects the storage medium out of the storage unit when a user is likely to move the storage unit.

Another object of the present invention is to provide an improved storage unit that automatically ejects a storage medium when a cable connecting the storage unit is disconnected from the host equipment.

Yet another object of the present invention is to provide an improved storage unit that keeps the power on to automatically eject a storage medium when a power switch on the storage unit is turned to an off position.

Still another object of the present invention is to provide an improved storage unit that automatically ejects the storage medium upon receiving an instruction to end the operation of the storage unit.

A further object of the present invention is to provide an improved storage unit that provides the option of having the storage medium automatically ejected from the storage unit during the conditions mentioned above.

Yet a further object of the present invention is to provide an improved detachable storage unit that automatically ejects the storage medium upon receiving information that the host equipment sent an instruction to discharge the storage unit from a device bay.

Still a further object of the present invention is to provide an improved detachable storage unit with a security system.

More specifically, an additional object of the present invention is to provide an improved detachable storage unit that prevents both the removal of the storage unit from the host equipment and the unauthorized use of the storage unit.

Yet an additional object of the present invention is to provide an improved detachable storage unit that prevents the exchange of data between the storage unit and the host equipment without authorization.

Still an additional object of the present invention is to provide an improved storage unit that automatically discharges an unauthorized storage unit that is placed in the host equipment.

These and other objects of the present invention are discussed or will be apparent from the detailed description of the invention.

SUMMARY OF THE INVENTION

In one aspect of the invention, a storage unit holding an ejectable storage medium is detachably connected to host equipment in a computer system. The storage unit has a connection detector for detecting whether the storage unit is connected to the host equipment and a storage medium detector for detecting the presence of a storage medium within the storage unit. An automatic medium ejection mechanism is provided for automatically ejecting the storage medium upon receiving a medium discharge instruction. A medium ejection instructor sends a medium ejection instruction to the automatic medium ejection mechanism upon receiving information that indicates that the storage unit might be moved. The ejection of the storage medium from the storage unit prevents damage caused by the storage unit colliding with internal components of the storage unit while the storage unit is being moved.

In another more specific aspect of the invention, the information indicating that the storage unit might be moved includes information about whether the storage unit is still connected to the host equipment, whether the medium is still in the storage unit, whether the power to the storage unit has been turned off, whether an end or start instruction for use of the storage unit has been transmitted, and/or whether a response is received responding to an indicator light, alarm message or query message, or any combination of these indicators.

In yet another aspect of the invention, passwords are used to prevent unauthorized use of the storage unit and to prevent an unauthorized storage unit from being inserted into the device bay.

BRIEF DESCRIPTION OF THE DRAWINGS

FIG. 8 is a diagram illustrating the process for the exchange of data between the storage unit shown in FIG. 6 and host equipment in the present invention;

DESCRIPTION OF THE PREFERRED EMBODIMENT

Figure 1:
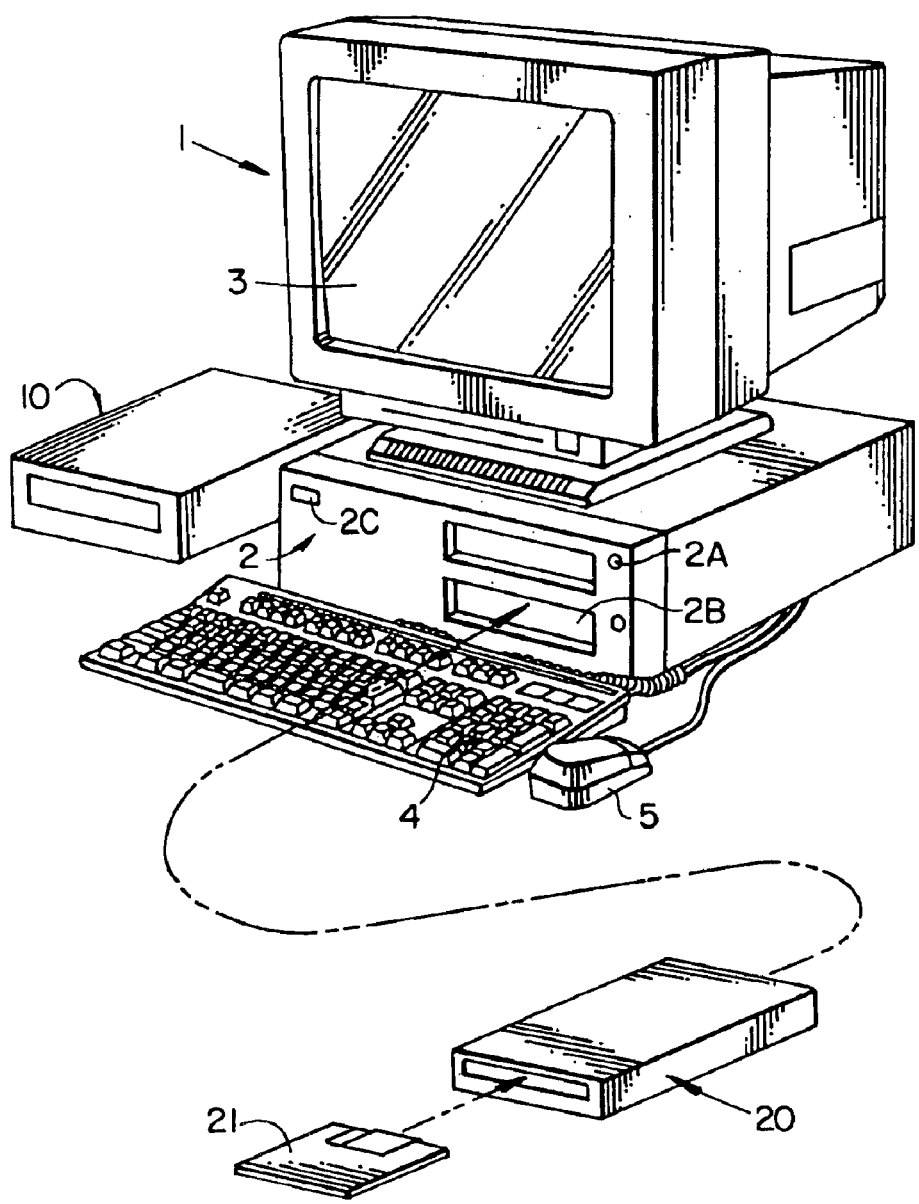
FIG. 1 is an isometric view of a personal computer connected to storage devices of the present invention.

FIG. 1 illustrates examples of host equipment such as a personal computer 1 (hereinafter "PC 1"). While personal computer (PC) 1 compiles with, and applies to, the IEEE 1394 standards in the preferred embodiment, the present invention also applies to any interface that supports plug and play, such as USB. Peripheral equipment such as detachable storage units 10, 20 are also provided. The PC 1 includes a main body 2 with a device bay 2B and a display unit 3. The storage unit 20 is shaped to fit into the device bay 2B. A switch 2A is used for ejecting the storage unit 20 from the device bay 2B, and a power source switch 2C is also provided to turn the power to the main body 2 on or off. Input units, such as a keyboard 4, a mouse 5 and other peripherals such as the external storage device 10, are connected to the PC body 2 through an IEEE 1394 standard cable 7 (shown in FIGS. 2 and 3). The storage units 10, 20 read and write to storage medium 11 (shown in FIG. 2), 21, respectively. Examples of storage medium used in the storage units 10, 20 include magneto-optical disks (MO), hard disks (HD), floppy disks (FD), CD-ROMs, DVDs, IC cards, etc.

Figure 2:
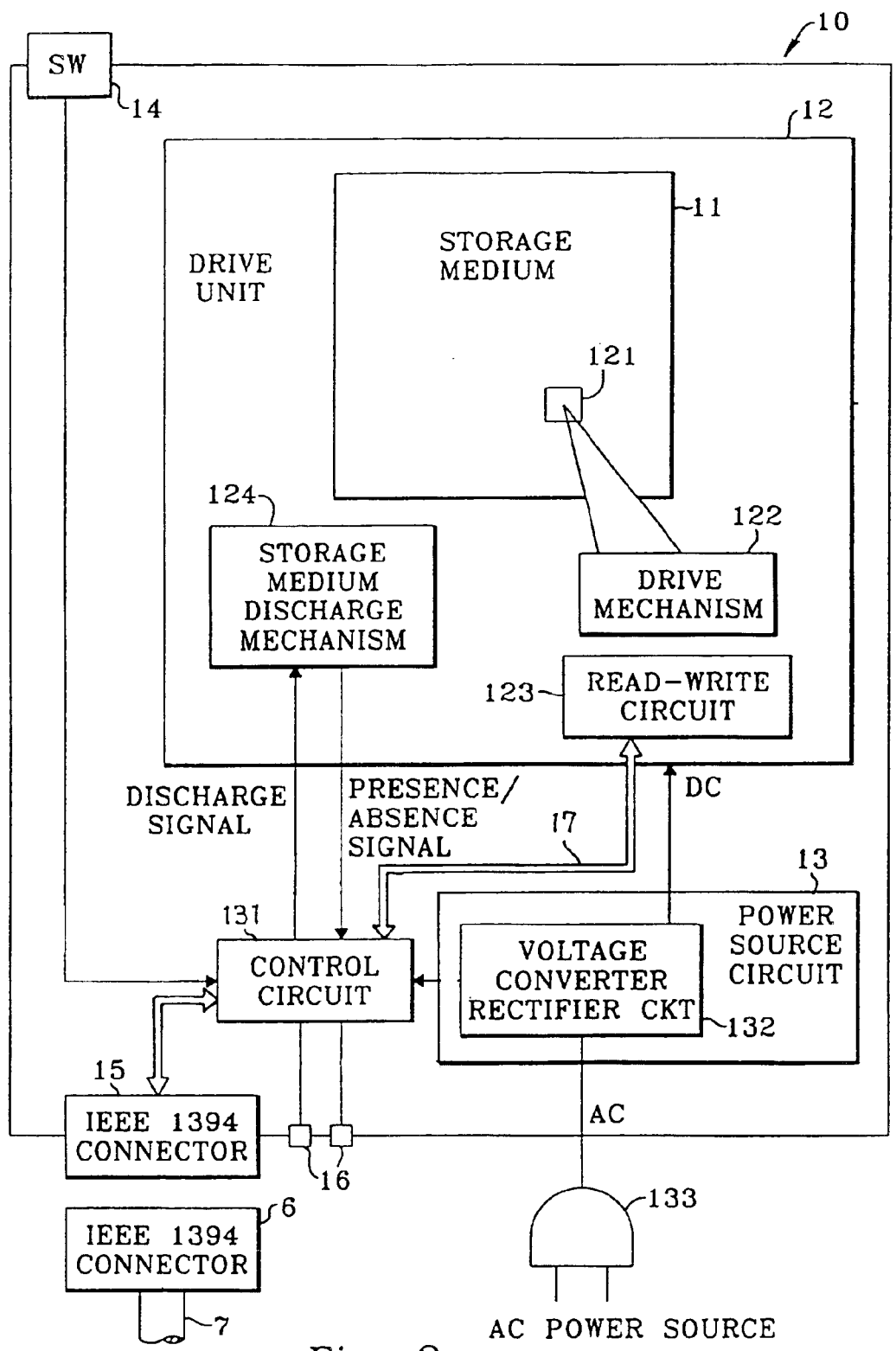
FIG. 2 is a block diagram illustrating the components of a storage unit according of the present invention.

FIG. 2 illustrates the internal components of the storage unit 10 from FIG. 1. The storage unit 10 includes a drive unit 12 for driving a storage medium 11, a power source circuit 13, a control circuit 131, a power source switch 14, an IEEE 1394 connector 15, and a dip switch 16 which is located on the back of the storage unit 10 (not shown). The drive unit 12 has a head 121 for reading and writing data to and from the storage medium 11, a drive mechanism 122 for moving the head 121 and a read-write circuit 123 connected to the head 121. The read-write circuit 123 processes signals read out from, and to be written to, the storage medium 11. The drive unit 12 also has a storage medium ejection mechanism 124.

A power source circuit 13 includes a voltage converter/rectifier circuit 132. The power source switch 14 is preferably provided on the front surface of the storage unit 10 and transmits an on/off signal to the control circuit 131. The control circuit 131 is connected to an IEEE 1394 connector 15 which is attached to the back surface of the storage unit 10, and is connected to the PC 1 shown in FIG. 1 through an IEEE 1394 connector 6 and a cable 7. The setting of the dip switch 16 is also transmitted to the control circuit 131.

The read-write circuit 123 is connected to the control circuit 131 through a bus 17. The voltage converter/rectifier circuit 132 is connected to an AC power source using a plug 133, and converts the AC power into DC power, which is then supplied to the drive unit 12 and to the control circuit 131.

The control circuit 131 receives a medium present/absent signal from the storage medium ejection mechanism 124 and transmits an ejection signal back to the storage medium ejection mechanism 124 at predetermined times, but only while the storage medium 11 is within the drive unit 12.

Figure 3A:
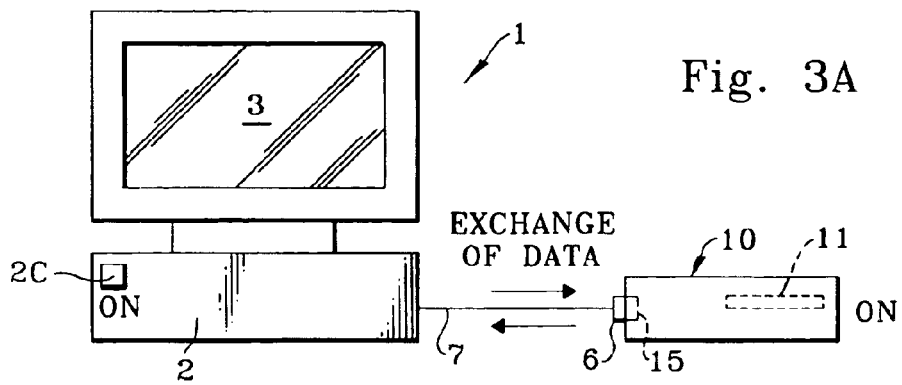
FIGS. 3(a) to 3(c) are diagrams illustrating the operation of an aspect of the storage unit of FIG. 2.
Figure 3B:
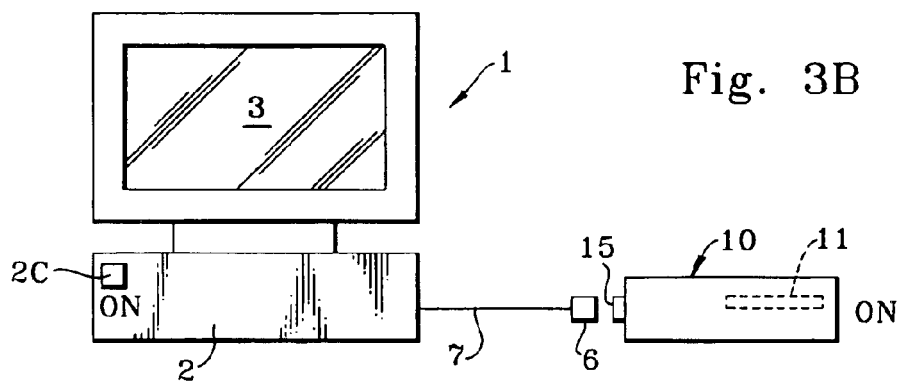
Figure 3C:
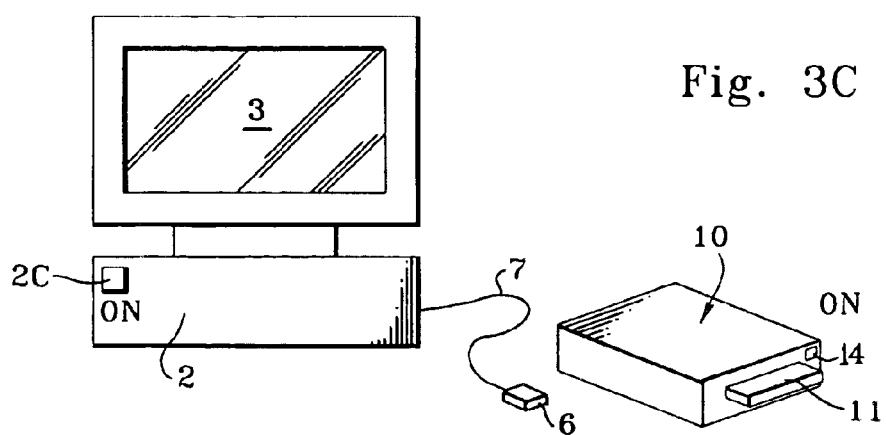

FIGS. 3(*a*) to 3(*c*) illustrate the operation of the storage unit 10 shown in FIG. 2. As shown in FIG. 3(*a*), the power source switch 2C of the PC 1 is turned on, and the power source switch 14 (not shown) is turned on which causes the power source circuit 13 to supply power to the drive unit 12. In this mode, the PC 1 is connected to the storage unit 10 through the IEEE 1394 connectors 6 and 15, and exchanges data with the storage medium 11 in the storage unit 10 through the cable 7 (as indicated by the arrows above and below cable 7).

Once the exchange of data is finished and the user removes the IEEE 1394 connector 6 from the IEEE 1394 connector 15 while the power is supplied to the storage unit 10 (as shown in FIG. 3(*b*)), the storage medium ejection mechanism 124 automatically ejects the storage medium 11 as shown in FIG. 3(*c*). Thus, the storage medium 11 preferably will not stay in the storage unit 10 when the storage unit is moved. This prevents damage or other problems that stem from the storage medium 11 staying in the unit when the storage unit 10 is moved.

Figure 4A:
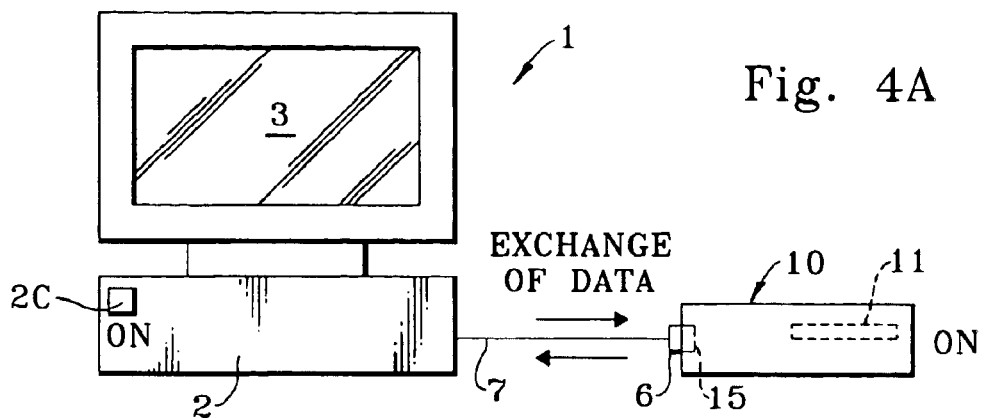
FIGS. 4(a) to 4(c) are diagrams illustrating the operation of a further aspect of the storage unit of FIG. 2.
Figure 4B:
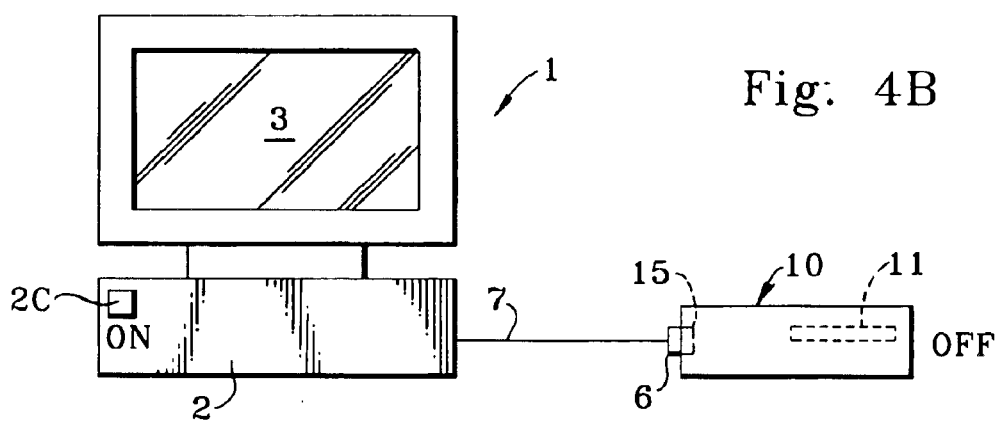
Figure 4C:
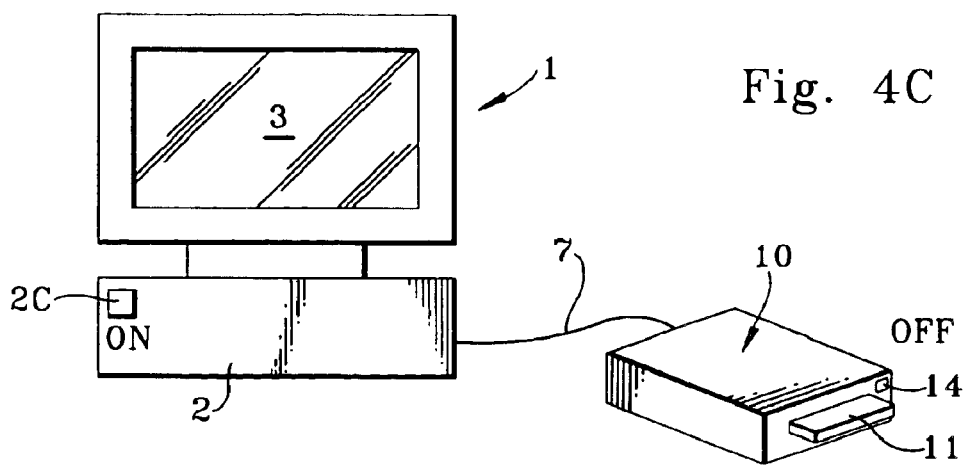

FIGS. 4(*a*) to 4(*c*) illustrate a further aspect of the storage unit 10 shown in FIG. 2. As shown in FIG. 4(*a*), similar to FIG. 3(*a*), the power for both the PC 1 and the storage unit 10 is turned on so that the PC 1 exchanges data with the storage medium 11 through the cable 7 (as indicated by the arrows above and below cable 7).

Once the exchange of data is finished, a user may turn off the power to the storage unit 10 without disconnecting the IEEE 1394 connector (as shown in FIG. 4(*b*)) in order to move the storage unit 10 a short distance within the reach of the cable 7. In this situation, the storage medium ejection mechanism 124 in the storage unit 10 operates to automatically eject the storage medium 11 as shown in FIG. 4(*c*) even though the power source switch 14 is turned off. This prevents damage to the disk or head since the storage medium 11 does not stay in the storage unit 10 when the unit 10 is moved.

Figure 5:
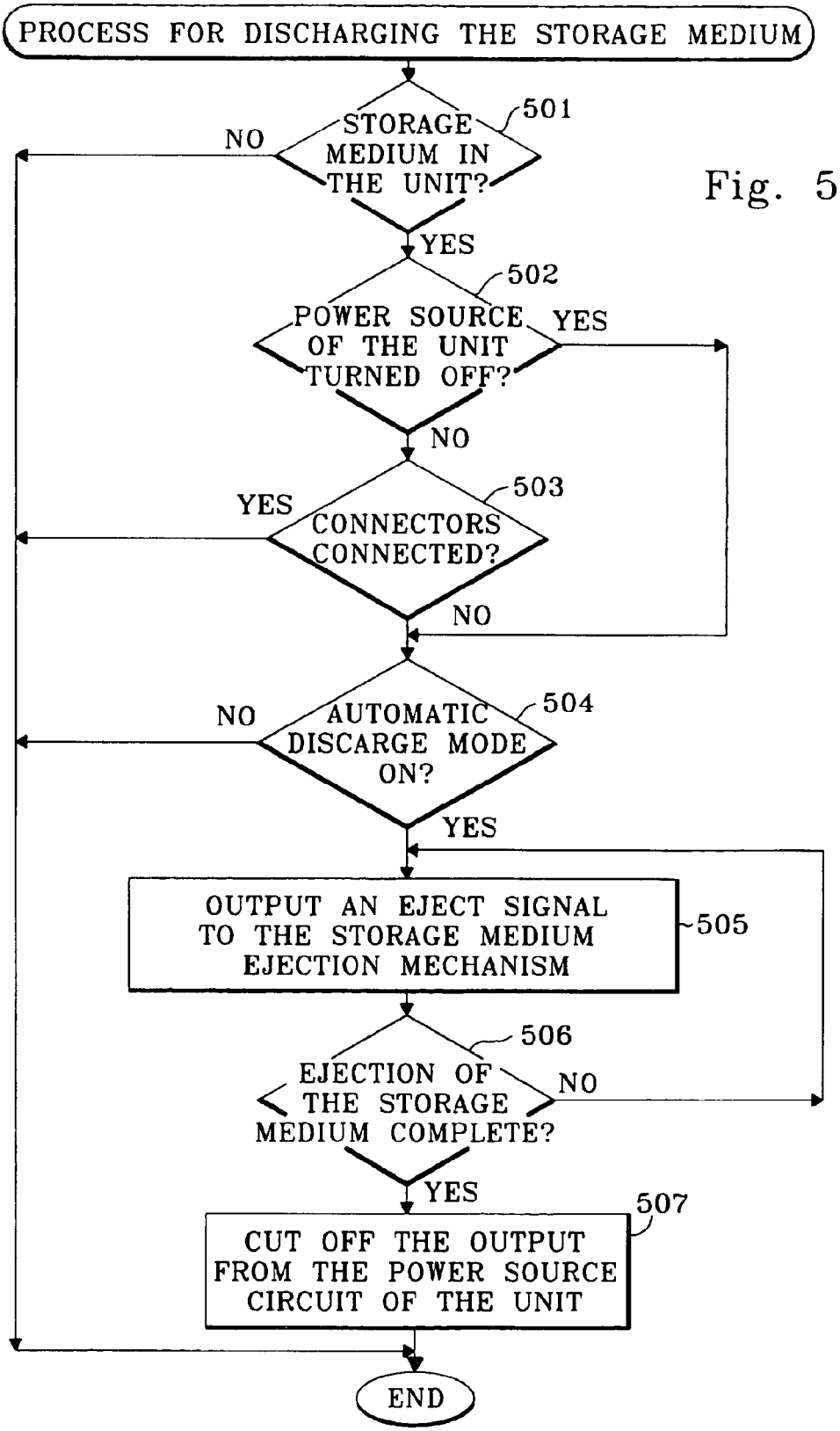
FIG. 5 is a flow chart explaining the control procedure for the storage unit described in FIGS. 2–4(c)

FIG. 5 illustrates the control procedure executed by the control circuit 131 shown in FIG. 2 to execute the two aspects of the present invention mentioned above. In a first step 501, the storage medium ejection mechanism 134 detects whether or not the storage medium 11 is held in the storage unit 10 and transmits the finding to control circuit 131. When no storage medium 11 is in the storage unit 10, the ejection is not needed, and the routine ends. On the other hand, when the storage medium 11 is held in the storage unit 10, the process proceeds to step 502 where the control circuit 131 detects whether or not the power for the storage unit 10 is turned off. When the power is off, the process proceeds to step 504. When the power is on, however, the process proceeds to a step 503 where the control circuit 131 determines whether or not the IEEE 1394 connector 15 is connected to the connector 6. If the IEEE 1394 connector 15 is still connected, the routine ends. If the IEEE 1394 connector 15 is disconnected, however, the program proceeds to the step 504.

In step 504, the control circuit 131 determines whether or not the automatic ejection mode for the storage medium 11 is turned on or off by determining whether the dip switch 16 is set to turn the ejection mode on or off. When the power source of the storage unit 10 is off, indicated by a YES answer in step 502, while the automatic ejection mode is on or when the connectors 6, 15 are disconnected, indicated by a NO answer in step 503, the storage medium 11 is automatically ejected from the storage unit 10. If, however, the automatic ejection mode is off, no ejection occurs and the routine ends at step 504.

When the automatic ejection mode is on, the routine proceeds to a step 505 where an ejection signal is transmitted to the storage medium ejection mechanism 124 in the drive unit 12. In a step 506, the control circuit 131 determines whether or not the ejection of the storage medium 111 is complete. If the ejection of the storage medium 11 is not complete, the routine returns to step 505 and the eject signal is continuously output to the storage medium ejection mechanism 124. On the other hand, if it is confirmed that the ejection of the storage medium 11 is complete during step 506, the routine proceeds to a step 507 which cuts off the output from the power source circuit 13 of the storage unit 10. Thus, despite the power source switch 14 in the storage unit 10 being turned off at step 502, the output from the power source circuit 13 is not cut off until step 507, and the storage medium 11 will be completely ejected even after the power source switch 14 is shut off.

Setting the automatic ejection mode on or off is not limited to a method that waits for a user to set the dip switch 16. It may also be carried out by, for example, providing a memory in the control circuit 131 of the storage unit 10 with a bit for controlling the automatic ejection mode, and by writing a flag into the bit from the host equipment or by erasing the flag. With this configuration, the control circuit 131 will determine that the automatic ejection mode is on when the flag is raised on the bit and determine that the mode is off when no flag is raised. This determination can be made by the control circuit 131 during the step 504.

Figure 6:
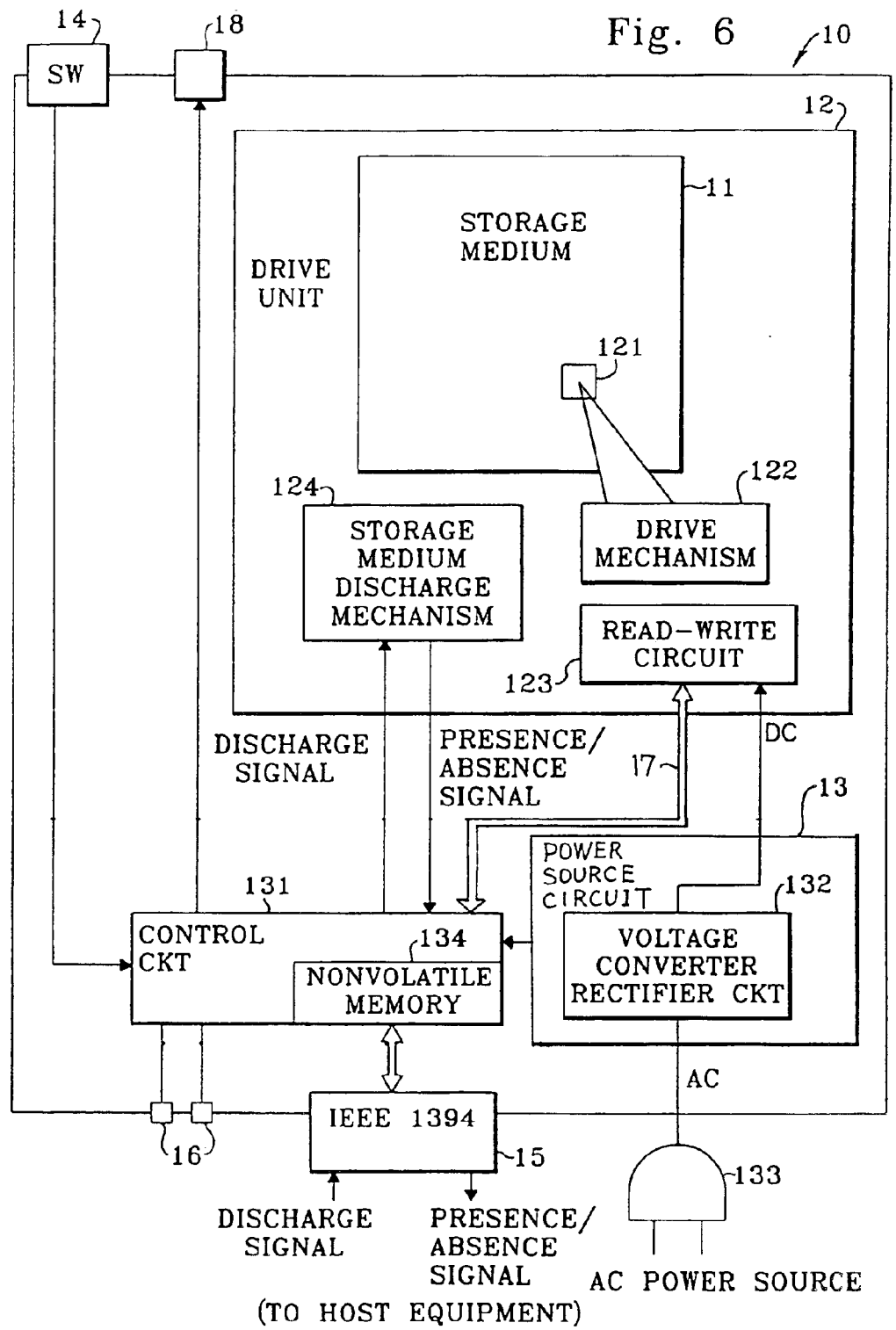
FIG. 6 is a block diagram illustrating the components of another storage unit according in the present invention.

FIG. 6 illustrates the internal components of the storage unit 10 from FIG. 1 regarding other aspects of the present invention. The features in FIG. 6 that are similar or the same as features depicted in FIG. 2 have the same number as the features from FIG. 2 and will not be redescribed. In this configuration, the mode for automatically ejecting the storage medium 11, set by the dip switch 16, is input into the control circuit 131 and is stored in a nonvolatile memory 134.

The control circuit 131 is connected through a bus 17 to the read-write circuit 123 in the drive unit 12 and is further connected to the IEEE 1394 connector 15. The medium present/absent signal from the storage medium discharge mechanism 124 is transmitted to the control circuit 131 and then to the host equipment through the IEEE 1394 connector 15. A signal for ejecting the storage medium 11 from the host equipment is transmitted to the storage medium discharge mechanism 124 at a predetermined time through the IEEE 1394 connector 15 and control circuit 131.

In addition, the front surface of the storage unit 10 shown in FIG. 6 is provided with an indicator 18 for indicating that the storage medium 11 in the storage unit 10 is in operation or that the storage medium is being ejected. The indicator 18 may have two indicator elements, such as two light-emitting diodes, to separately indicate the storage medium 11 operation or ejection. One diode turns on upon receiving a start instruction or a log-in signal and turns off upon receiving an end instruction or a log-out signal, and the other diode indicates that the storage medium 11 is being ejected. The indicator 18 may also be a single indicator element such as a two-color-light-emitting diode to indicate that the storage medium 11 is in operation or is being ejected. Other types of indicators are also contemplated as being within the scope of the invention.

FIGS. 7(*a*) to 7(*d*) are diagrams illustrating the operation of the storage unit 10 shown in FIG. 6 according to further aspects of the present invention. In FIG. 7(a), the power source switch 2C of the PC 1 is turned on, and the power for the storage unit 10 is turned on. In addition, PC 1 is connected to the storage medium 11 through the IEEE 1394 connectors 6 and 15, and is exchanging data with the storage medium 11 through the cable 7.

Figure 7A:
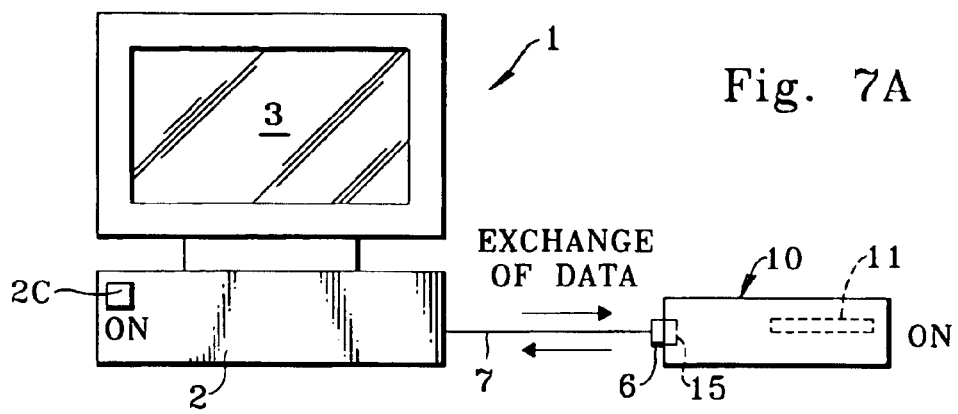
FIGS. 7(a) to 7(d) are diagrams illustrating the operation of an aspect of the storage unit of FIG. 6.
Figure 7B:
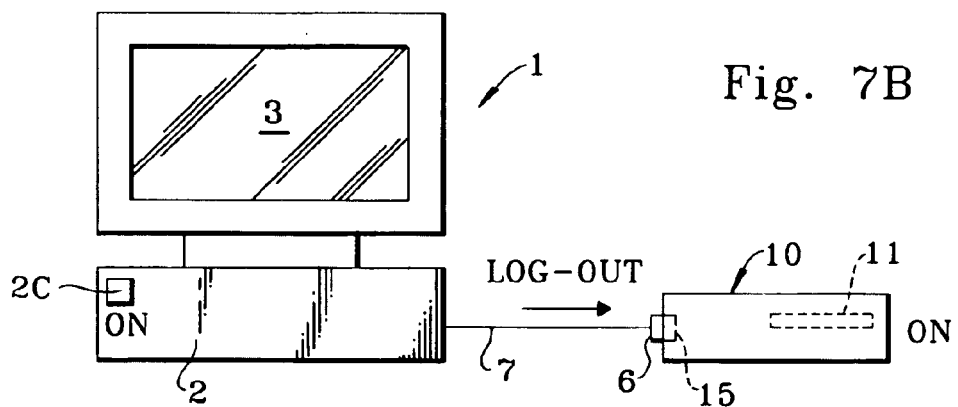
Figure 7C:
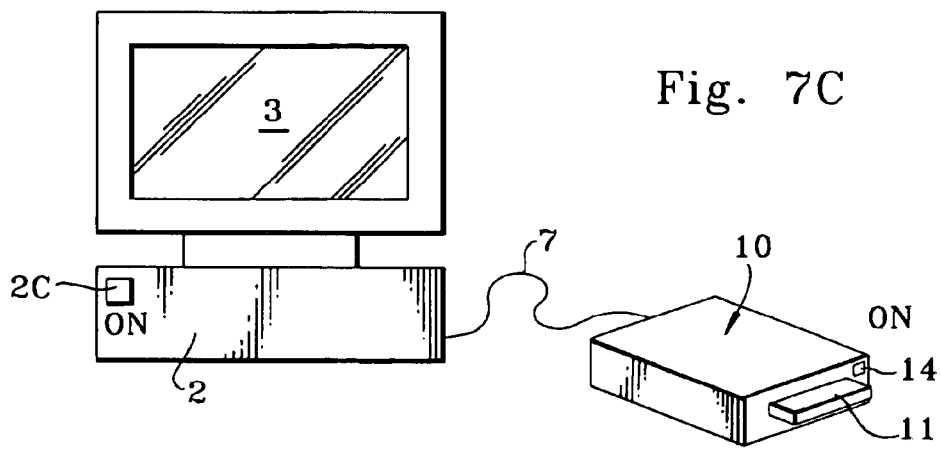
Figure 7D:
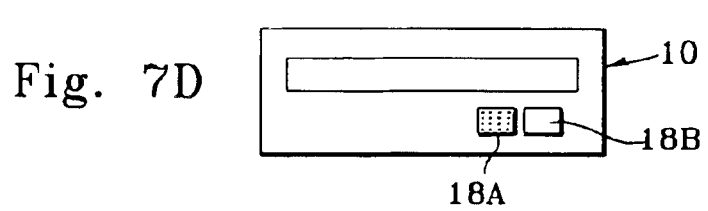

When the exchange of data is finished and a log-out signal is received by the storage unit 10 from the PC 1 through the cable 7 (as shown in FIG. 7(b)), the storage medium ejection mechanism 124 in the storage unit 10 operates to automatically eject the storage medium 11 (as shown in FIG. 7(c)), and the indicator 18A provided on the front surface of the storage unit 10 turns on to indicate that the storage medium 11 is being ejected (as shown in FIG. 7(d)). Thus, when the exchange of data from PC 1 has finished, the log-out signal prevents the storage medium 11 from remaining in the storage unit 10. While the storage medium 11 is being ejected, furthermore, the indicator 18 is turned on so that a user can also confirm the eject operation.

Another indicator 18B shown in FIG. 7(d) indicates that the storage medium 11 is operating, and turns on upon receiving a log-in signal from the PC 1 and turns off upon receiving a log-out signal.

FIG. 8 is a diagram illustrating the exchange of data between the storage unit 10 of the present invention and the host equipment, PC 1. In this diagram, PC 1 is indicated as an initiator. First, the initiator sends a query to the storage unit 10 asking what kind of unit it is and what kind of connection is being used. After a response is received from the storage unit 10, a log-in signal is transmitted to the storage unit 10 from the initiator, and the exchange of data starts after the storage unit 10 has responded to the login signal.

To exchange the data, the initiator forms a command list X (map format). Then processes A, B and C, based on the maps, are executed by a map finish trigger in the initiator and in the storage unit 10. When these processes are finished, the storage unit 10 assumes a standby state, and a next command list Y (map format) is formed in the initiator. Then, the processes D, E based on the maps are executed by the map finish trigger in the initiator and the storage unit 10. When these processes are finished, the storage unit 10 assumes a standby state. After the exchange of data is complete, the initiator transmits a log-out signal to the storage unit 10. Once the log-out signal is received, the storage unit 10 executes the procedure for ejecting the recording medium 11 shown in FIGS. 7(a) to (d).

Figure 9:
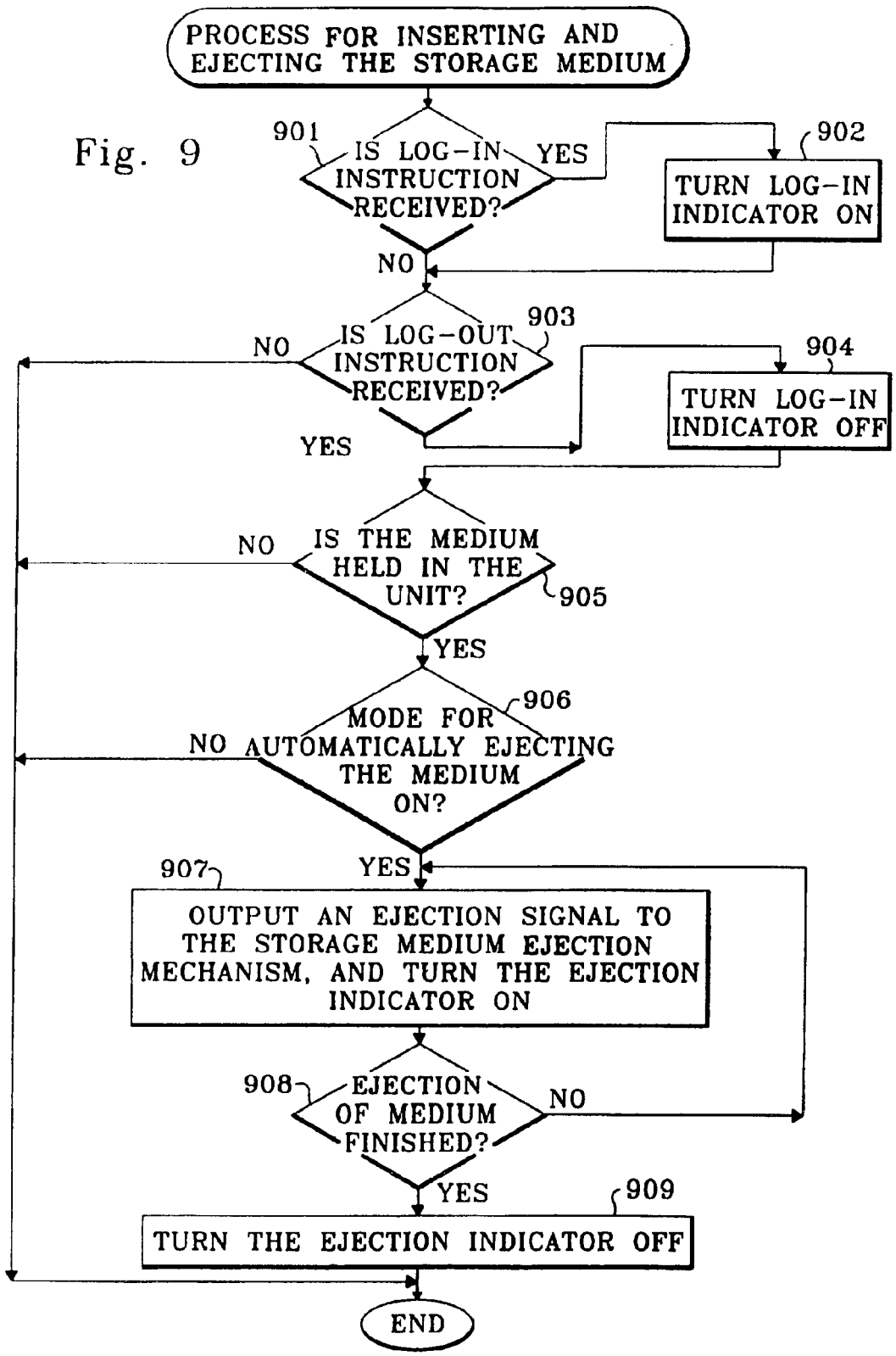
FIG. 9 is a flow chart explaining a control procedure for the storage unit described in FIGS. 6–8.

FIG. 9 illustrates a control procedure executed by the control circuit 131, explained with reference to FIG. 6, in order to execute the operation of yet another aspect of the invention. The control procedure of FIG. 9 includes the procedure for turning the indicator 18B on and off, as shown in FIG. 7(d), and relates to the process of exchanging data illustrated in FIG. 8.

In a first step 901, the control circuit 131 determines whether or not the storage unit 10 has received a log-in signal from the PC 1. When no log-in signal has been received, the process proceeds to a step 903. When the log-in signal has been received, the process proceeds to a step 902 which turns on the log-in indicator 18B, and then proceeds to step 903. This ensures that the log-in indicator 18B turns on after the long-in signal is received.

In step 903, the control circuit 131 determines whether or not a log-out signal is input to the storage unit 10 from the PC 1. When no log-out signal has been received, the routine ends. When the log-out signal has been received, the routine proceeds to a step 904 which turns off the log-in indicator 18B and then proceeds to a step 905. This ensures that the log-in indicator 18B turns off after the log-out signal has been received.

In step 905, the storage medium discharge mechanism 124 detects whether or not the storage medium 11 is being held in the storage unit 10 and transmits its finding to the control circuit 131. When no storage medium 11 is in the storage unit 10, no need to execute the discharge operation exists and the routine ends. When the storage medium 11 is held in the storage unit 10, however, the routine proceeds to a step 906 where the control circuit 131 determines whether or not the mode for automatically ejecting the storage medium 11 has been turned on. The mode for automatically ejecting the medium is set by the dip switch 16 described with reference to FIG. 6, or is set by setting a flag on a predetermined bit in the memory 134 in the control circuit 131, depending on the input from the host equipment. When the control circuit 131 finds that the mode for automatically ejecting the medium is off during step 906, the routine ends. When the mode for automatically ejecting the medium is on, on the other hand, the program proceeds to a step 907.

In step 907, the control circuit 131 transmits an eject signal to the storage medium ejection mechanism 124 of the drive unit 12, and the ejection indicator 18A is turned on. In a subsequent step 908, the control circuit 131 determines whether or not the ejection of the storage medium 11 from the storage unit 10 is complete. If the ejection of the storage medium 11 is not finished, the program returns to step 907 where the ejection signal is continuously output to the storage medium ejection mechanism 124. Then in step 908, the control circuit 131 confirms that the ejection of the storage medium 11 from the storage unit 10 is complete, and the routine then proceeds to a step 909 where the ejection indicator 18A is turned off to end the routine. According to this aspect of the invention, when the log-out signal is received by the storage unit 10 from the PC 1 while the automatic ejection mode is turned on, the storage medium 11 is ejected from the storage unit 10 while the ejection indicator 18A is turned on.

Figure 10:
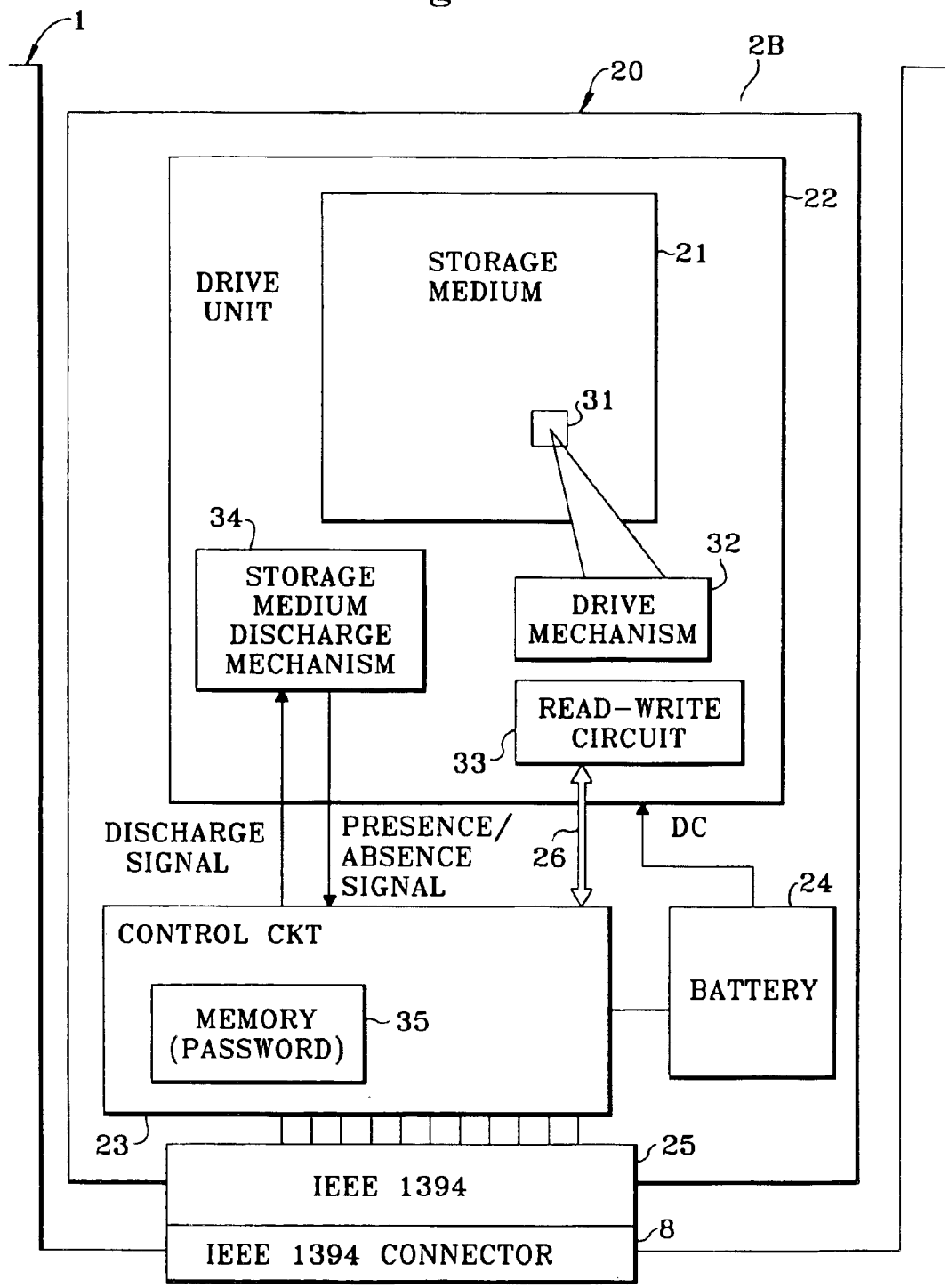
FIG. 10 is a block diagram illustrating the components of another storage unit of the present invention.

In another aspect of the present invention, FIG. 10 depicts the components of the detachable storage unit 20 with the storage unit 20 in device bay 2B. The storage unit 20 includes a drive unit 22 for driving a storage medium 21, a control circuit 23, a battery 24 and an IEEE 1394 connector 25. However, as mentioned above, other interface systems with plug and play are possible. The drive unit 22 includes a head 31, a drive mechanism 32 for the head 31, a read-write circuit 33 connected to the head 31, and a storage medium discharge mechanism 34. The control circuit 23 includes a memory 35. The IEEE 1394 connector 25 is attached to the back surface of the storage unit 20, and is connected to an IEEE 1394 connector 8 in the device bay 2B when the storage unit 20 is loaded in the device bay 2B. Furthermore, a unique password assigned to the storage unit 20 is stored in the memory 35 in the control circuit 23.

The control circuit 23 is connected to the host equipment, PC 1, through the IEEE 1394 connectors 25 and 8, and a bus 26 connects the control circuit 23 to the read-write circuit 33. The storage medium ejection mechanism 34 transmits a medium present/absent signal to the PC 1 through the control circuit 23 and the IEEE 1394 connectors 25, 8. Furthermore, a signal for ejecting the storage medium 21 from the PC 1 is received by the control circuit 23 through the IEEE 1394 connectors 8, 25, and is then transmitted to the storage medium ejection mechanism 34 from the control circuit 23.

In addition, the battery 24 serves as a power source for the drive unit 22, the control circuit 23 and the storage medium ejection mechanism 34. Therefore, the storage medium 21 can be ejected from the storage unit 20 even after the storage unit 20 is discharged from the device bay 2B. The battery 24 may have an ordinary cell or a rechargeable cell. When the rechargeable cell is utilized, it may be charged through the control circuit 23 by using the DC power from the PC 1.

Figure 11:
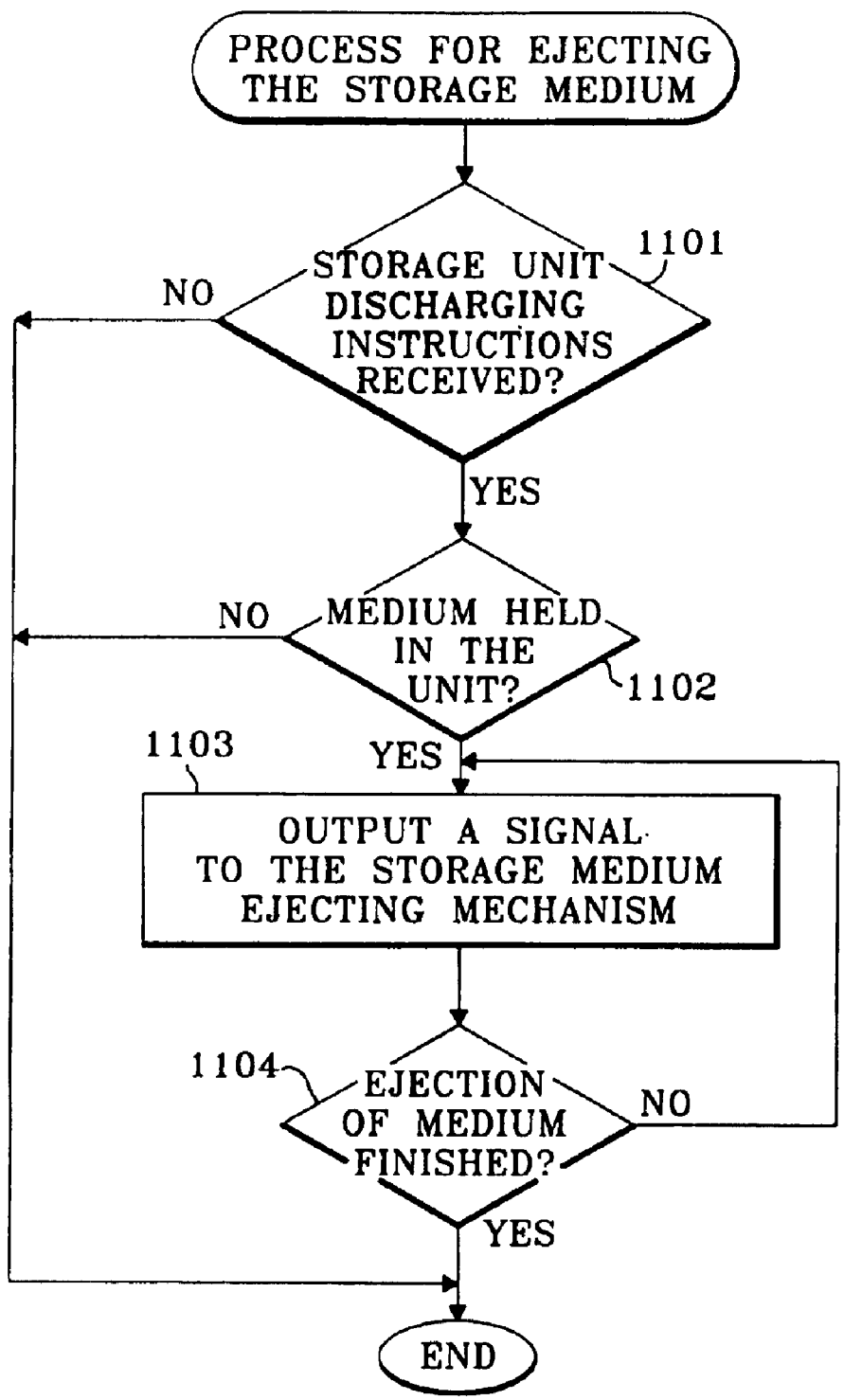
FIG. 11 is a flow chart explaining a process for the storage unit of FIG. 10.

The storage unit 20 preferably has a number of ejection features relating to the ejection of medium 21 from within the storage unit 20 when the storage unit 20 receives a message that the PC 1 will instruct a discharge mechanism (not shown) to discharge the storage unit 20 from the bay 2B. When this message is received, the storage unit 20 ejects the storage medium 21 before the PC 1 discharges the storage unit 20. FIG. 11 illustrates the control procedure for this feature and explains the operation of the control circuit 23 in the storage unit 20.

As shown in FIG. 11, at a step 1101, the control circuit 23 determines whether or not it has received a message that the memory unit 20 will be discharged from the device bay 2B. If no discharge message has been received, the routine ends. If the discharge message has been received, the routine proceeds to a step 1102 where the storage medium ejection mechanism 34 determines whether or not the storage medium 21 is held in the storage unit 20 and transmits the finding to the control circuit 23. When no storage medium 21 is in the storage unit 20, the routine ends. When the storage medium 21 is held in the storage unit 20, the routine proceeds to a step 1103 where the control circuit 23 transmits an ejection signal to the storage medium ejection mechanism 34 of the drive unit 22.

In a step 1104, the control circuit 23 determines whether or not the ejection of the storage medium 21 from the storage unit 20 has been completed. When the ejection of the storage medium 21 is not complete, the routine returns to step 1103 where an ejection signal is continuously transmitted to the storage medium ejection mechanism 34 of the drive unit 22. When the control circuit 23 confirms that the ejection of the storage medium 21 from the storage unit 20 is complete, the routine ends.

With this procedure, the discharge mechanism (not shown) in the PC 1 is able to immediately start discharging the storage unit 20 from the device bay 2B right after it receives an instruction for discharging the storage unit 20 from the device bay 2B. This routine can occur because the storage medium 21 can be ejected from the storage unit 20 independent of PC 1 operations because the storage unit 20 has its own battery 24. Thus, the medium 21 can be ejected even though the storage unit 20 may already be discharged from the PC 1. When the control circuit 23 detects the disconnection of the IEEE 1394 connector 25 on the storage unit 20 from the IEEE 1394 connector 8 on the device bay 2B, the storage medium 21 is ejected from the storage unit 20 using battery power.

Figure 12:
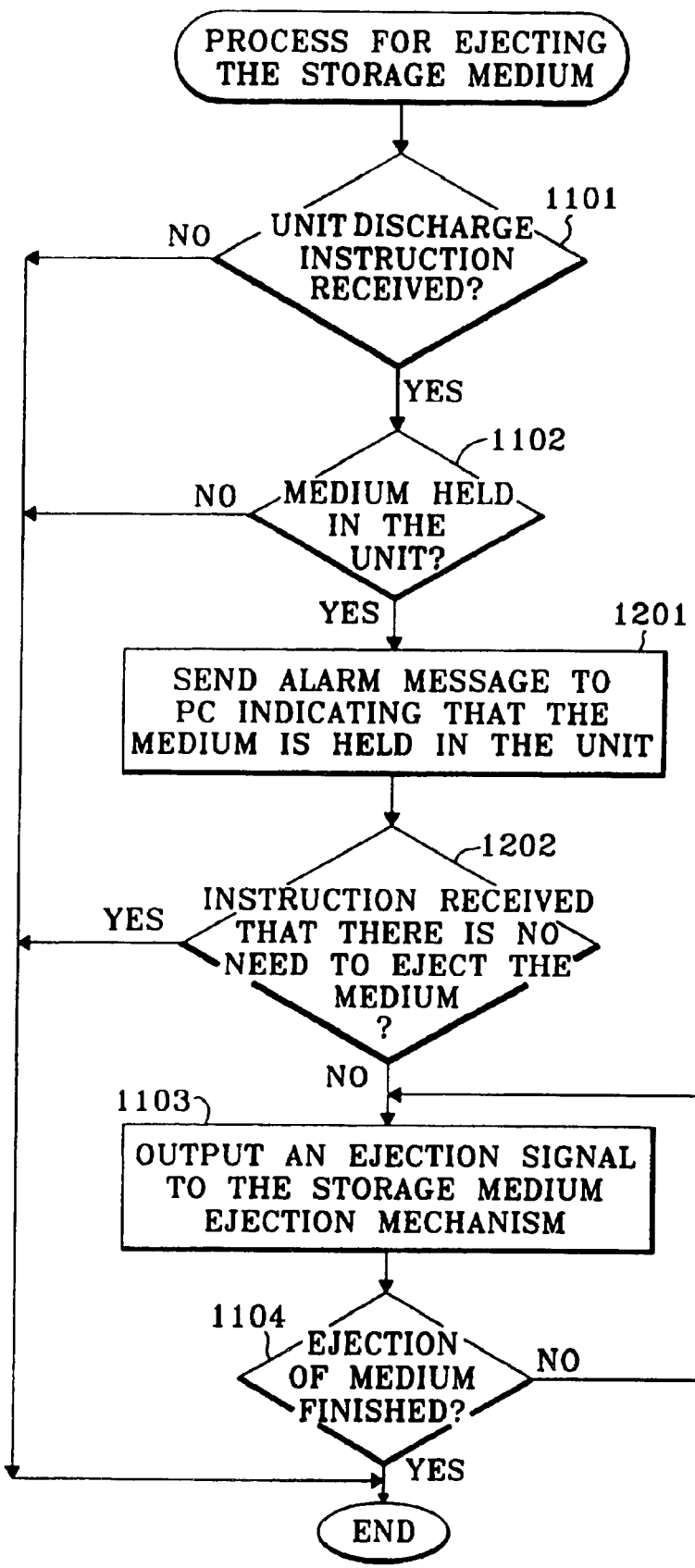
FIG. 12 is a flow chart explaining another process for the storage unit of FIG. 10.

In a second aspect of the storage unit 20, upon receiving a message that the storage unit 20 will be discharged, the storage unit 20 sends an alarm message to the PC that indicates that the storage medium 21 is in the storage unit 20. A display unit 3 of the PC 1 then displays the alarm message before the device bay 2B discharges the storage unit 20. FIG. 12 illustrates the control procedure according to this aspect, and explains the operation of the control circuit 23.

As shown in FIG. 12, the control procedure for the alarm adds steps 1201 and 1202 between steps 1102 and 1103 from the first aspect. Therefore, the steps already described will be summarized. In this second aspect of the invention, the control circuit 23 confirms that a message is received and that the storage unit 20 will be discharged from the device bay 2B in step 1101. In step 1102 the control circuit 23 confirms that the storage medium 21 is held in the storage unit 20, and then proceeds to step 1201 and transmits an alarm message to the PC 1 to indicate that the storage medium 21 is still held in the storage unit 20. The alarm message is processed in the PC 1 so that it can be displayed on the display unit 3.

In a subsequent step 1202, after the alarm is displayed, the control circuit 23 looks for a response that indicates whether or not there is a need to eject the storage medium 21. When the instruction is received stating there is no need to eject the storage medium 21, the routine ends. In this case, therefore, the storage medium 21 is not ejected from the storage unit 20 even though the storage unit 20 is discharged from the device bay 2B. On the other hand, when no instruction to keep the storage medium 21 in the storage unit 20 is received, the routine proceeds to the step 1103 and to the subsequent steps to eject the storage medium 21 from the storage unit 20.

In a third aspect of the storage unit 20, when a message is received that the storage unit 20 will be discharged, the storage unit sends a query message to the PC 1 asking whether or not the storage medium 21 should be ejected before discharging the storage unit 20. The question is then displayed on the display unit 3 before the device bay 2B discharges the storage unit 20.

Figure 13:
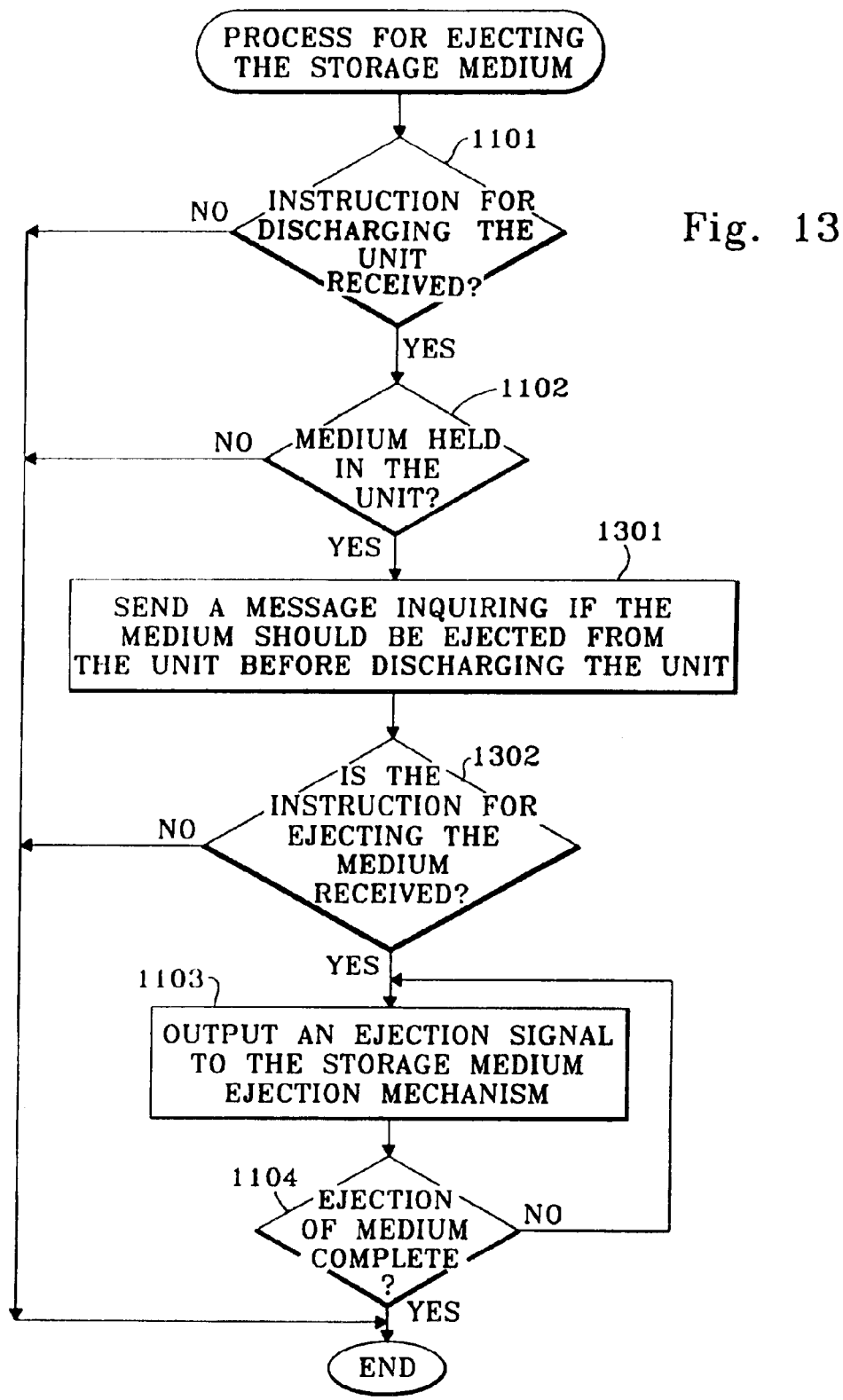
FIG. 13 is a flow chart explaining yet another process for the storage unit of FIG. 10.

FIG. 13 illustrates a control procedure according to this third aspect, and explains the operation of the control circuit 23. This control procedure adds steps 1301 and 1302 between the steps 1102 and 1103 of the first aspect. Therefore, the description of the steps already described will not be repeated.

In this third aspect, after the control circuit 23 confirms that an instruction to discharge the storage unit 20 exists and that the storage medium 21 is held in the storage unit 20, the routine proceeds to a step 1301 where a message is sent to the PC 1 asking whether or not the storage medium 21 held in the storage unit 20 is to be ejected before discharging the storage medium 20. The inquiry message is processed by the PC 1 and is displayed on the display unit 3.

In a subsequent step 1302, after the inquiry is displayed, the control circuit 23 looks for an instruction for ejecting the storage medium 21 before the discharge of the storage unit 20. The routine ends when an instruction is received stating that it is not necessary to eject the storage medium 21 before the discharge of the storage unit. In this case, the storage unit 20 is discharged from the device bay 2B without ejecting the medium. On the other hand, when an instruction is received at the step 1302 indicating that the storage medium 21 must be ejected before the storage unit 20 is discharged, the routine proceeds to the step 1103 and to the subsequent steps to eject the storage medium 21 before the storage unit 20 is discharged from the device bay 2B.

The storage unit 20 also has a fourth aspect that occurs when the storage unit 20 is going to be discharged from the PC 1. For this aspect, the storage unit 20 sends a message to the PC 1 requesting a password. The message is displayed on the display unit 3 of the PC 1 before the device bay 2B discharges the storage unit 20. When a password is received by the storage unit 20 and it is not in agreement with the password assigned to the storage unit, the storage unit is not ejected from the device bay 2B.

Figure 14:
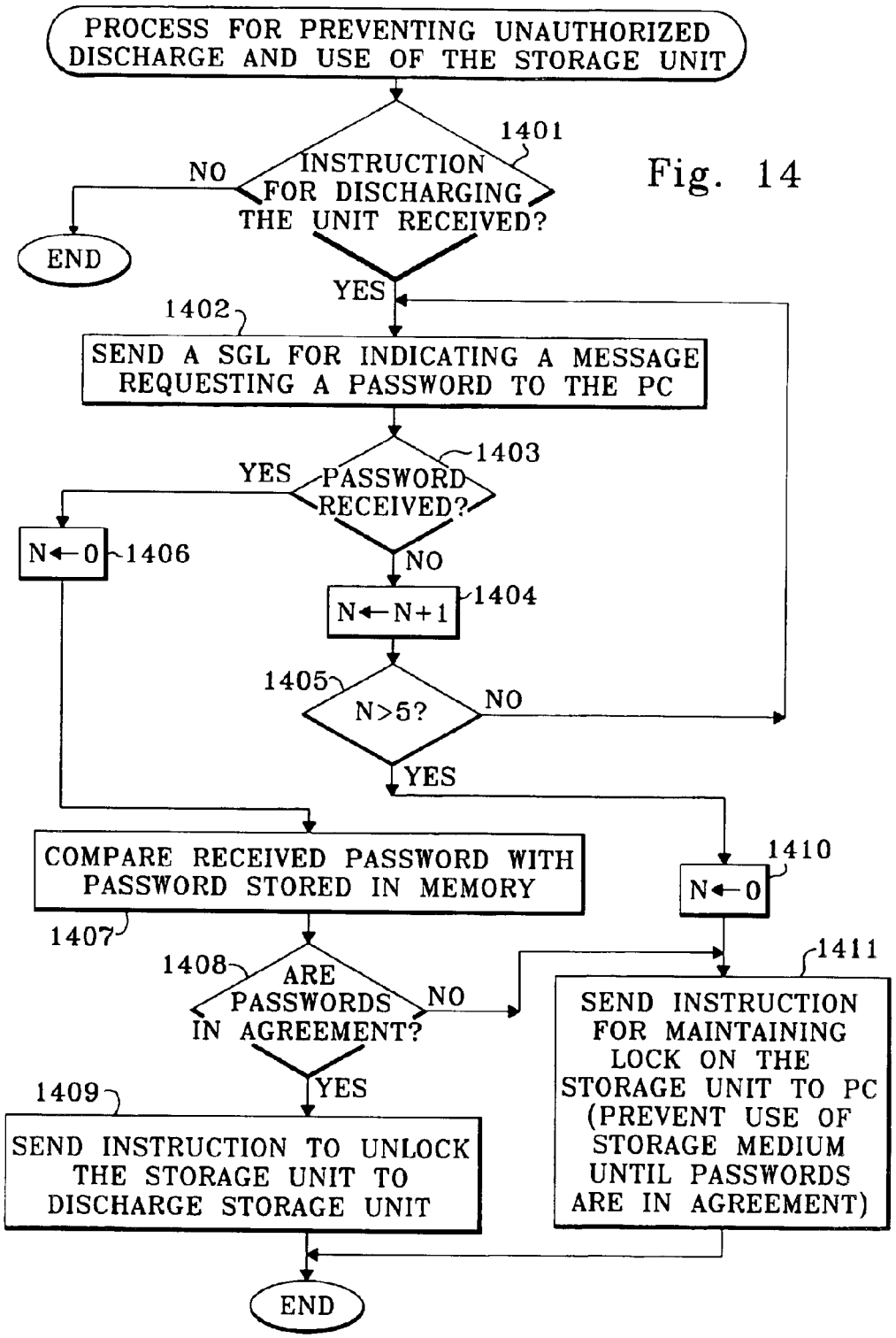
FIG. 14 is a flow chart explaining still another process for the storage unit of FIG. 10.

FIG. 14 illustrates a control procedure according to the fourth aspect of the storage medium 20, and illustrates the operation of the control circuit 23 in the control unit 20. In a step 1401, the control circuit 23 determines whether or not an instruction for discharging the storage unit 20 from the device bay 2B is received. When the discharge instruction has not been received, the routine ends. When the discharge instruction has been received, the routine proceeds to a step 1402 that has the storage unit 20 transmitting a message to the PC 1 requesting the input of a unique password assigned to the storage unit 20. The PC 1 processes the message that requests the password and displays it on the display unit 3.

In step 1403, after the message has been displayed, the control circuit 23 determines whether or not the password has been received. When the password is received, the routine proceeds to a step 1406 which clears a value of a counter N, which is then used to count the number of times the requesting message is displayed. The routine then proceeds to a step 1407 where the received password is compared with a password unique to the storage unit 20 that is stored in the memory 35 of the storage unit 20. In a step 1408, the control circuit 23 determines whether or not the password that is received is in agreement with the password unique to the storage unit 20.

If it is determined that the passwords are in agreement in step 1408, the routine proceeds to a step 1409 where the control circuit 23 transmits an instruction to the PC 1 instructing it to unlock the storage unit 20 so that the PC 1 can discharge the storage unit 20 from the device bay 2B. In response to this instruction, the PC 1 unlocks the storage unit 20 in the device bay 2B, and carries out the operation to discharge the storage unit 20 from the device bay 2B.

If, on the other hand, the control circuit 23 determines that the passwords are not in agreement in step 1408, the routine proceeds to a step 1411 where the control circuit 23 sends an instruction to the PC 1 to prevent the storage unit 20 from being unlocked. In response to this instruction, the PC 1 does not unlock the storage unit 20 in the device bay 2B, and the storage unit 20 is not discharged from the device bay 2B. In addition, at the step 1411, an instruction for inhibiting the use of the storage unit 20 in the device bay 2B also may be continuously sent to the PC 1 until a password is received that agrees with the password in memory 34.

If no password is received during step 1403, the routine proceeds to a step 1404 where a value of the counter N, having an initial value of 0, is increased by one. Then, the control circuit 23 determines whether or not the value of the counter N has exceeded five in a step 1405. If the value of the counter N is not larger than five at the step 1405, the routine returns to step 1402 where the message requesting the password is continuously sent to the PC 1.

If no password is received after repeating the procedure from steps 1402 to 1405 five times to request the password, the routine proceeds from step 1405 to step 1410 where the counter N is cleared. The routine then proceeds to a step 1411. At step 1411, the control circuit 23 sends an instruction to the PC 1 to keep the storage unit 20 locked in the device bay 2B, just as if the passwords did not agree, as in step 1408. When this occurs, the storage unit 20 is not discharged from the device bay 2B until a password is received that matches the unique password for the storage unit 20, which prevents the storage unit 20 from being taken by one that does not have authority to do so.

Figure 15:
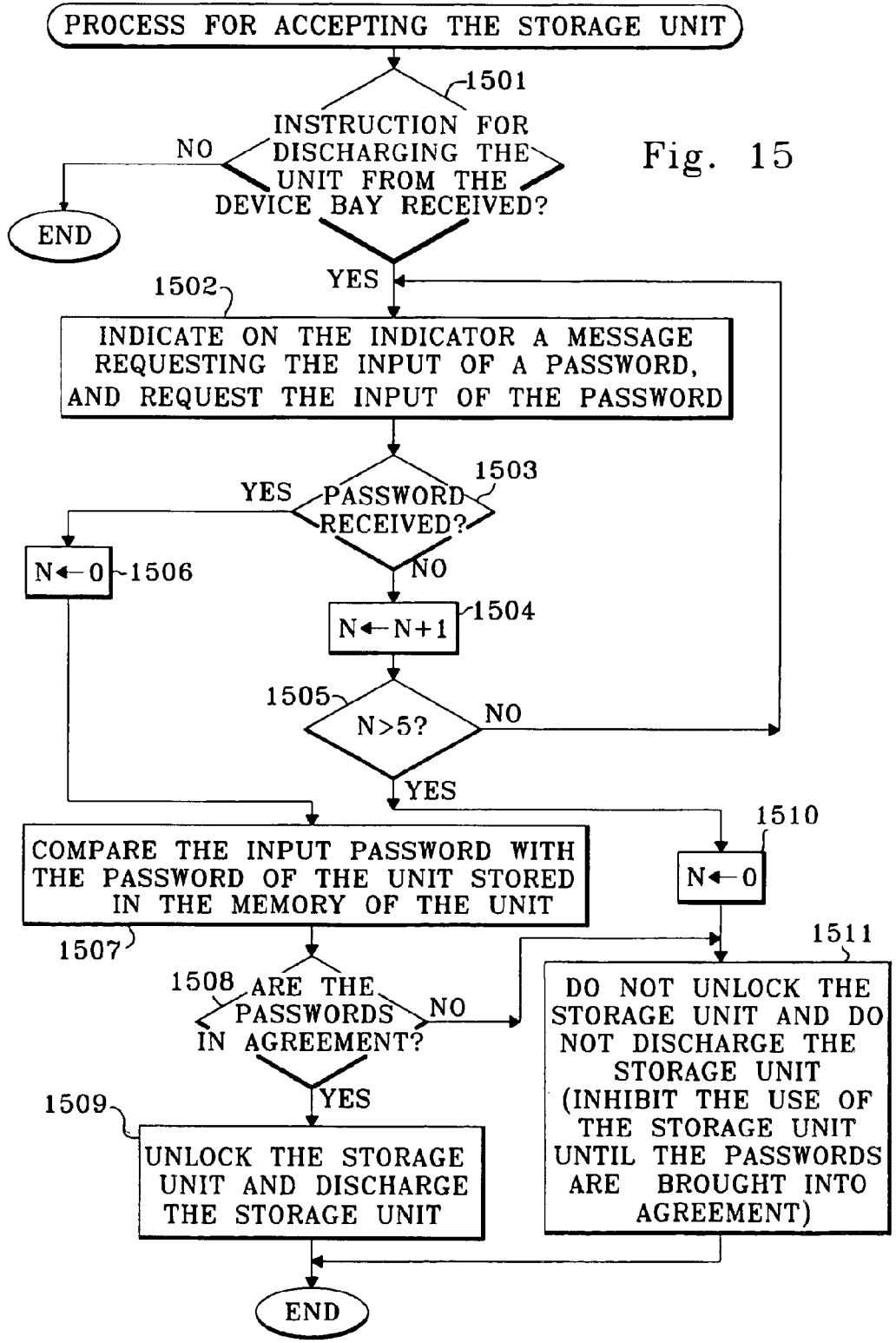
FIG. 15 is a flow chart explaining a security process for the storage unit of FIG. 10.

While the procedures for the storage unit 10 and the storage unit 20 above have the control circuit 23 or 131 making the detections, making the determinations and transmitting instructions or messages, these operations can also be carried out by the PC 1 instead. FIG. 15 explains a control procedure by PC 1 rather than a control circuit 23 or 131. This example uses the procedure for preventing discharge of the storage unit 20 from the device bay 2B unless the correct password for the storage unit 20 is received.

At a step 1501, the PC 1 determines whether an instruction for discharging the storage unit 20 from the device bay 2B exists. If the discharge instruction has not been detected, the routine ends. If the discharge instruction has been received, the routine proceeds to a step 1502 where the PC 1 displays a message requesting an operator to enter a password to unlock the storage unit 20 on the display unit 3. Subsequent steps 1503 to 1506 and 1510 correspond to the steps 1403 to 1406 and 1410 described with reference to FIG. 14, and therefore, are summarized as follows. As in the procedure of FIG. 14, when a password is received, it is compared to the password already stored in a memory 35 in the storage unit 20. If the passwords match, the routine proceeds to a step 1509 to unlock the storage unit 20 for discharge from the device bay 2B. If the passwords are not in agreement the routine proceeds to a step 1511 which maintains the lock on the storage unit 20 so that it cannot be discharged from the device bay 2B. In this case, too, use of the storage unit 20 in the device bay 2B may be prevented until the correct password is received.

When no password is received in the step 1503, the routine proceeds to steps 1504 and 1505 to repeat the request for a password on the display five times. When no password is received after displaying the password request message five times, the routine proceeds to step 1511 after the counter N is cleared at step 1510. At step 1511, the storage unit 20 is kept locked and the storage unit 20 is not discharged. The PC 1 will not unlock the storage unit 20 for discharge unless the passwords are in agreement.

In yet another aspect of PC 1, the PC 1 prevents a user from exchanging data with the PC by inserting a storage unit into device bay 2B without authorization. To accomplish this, the PC 1 will forcibly discharge an unauthorized storage unit from the device bay 2B so that data cannot be exchanged with the PC 1. In this case, the unique passwords assigned to specific peripheral equipment, such as storage unit 20, that can be used in the device bay 2B must be registered in advance in the memory of the PC 1.

Figure 16:
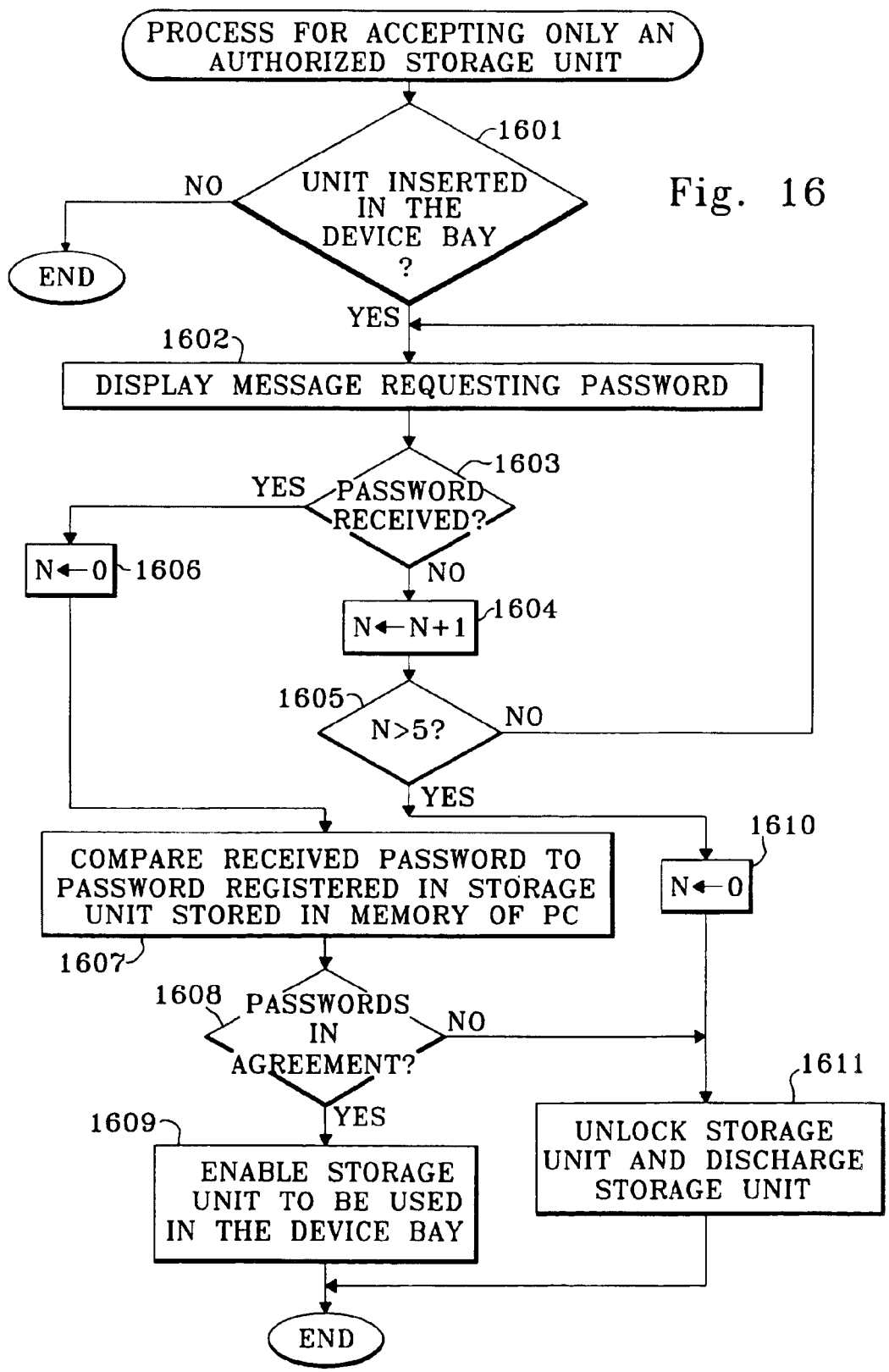
FIG. 16 is a flow chart explaining another security process for the storage unit of FIG. 10.

FIG. 16 explains a process controlled by the PC 1 to accept an authorized storage unit 20 from FIG. 10 when it is inserted in the device bay 2B. In a step 1601, the PC 1 determines whether or not the storage unit 20 is inserted in the device bay 2B. If the storage unit 20 is not inserted, the routine ends. If the storage unit 20 is inserted in the device bay 2B, the routine proceeds to a step 1602 where a message is displayed on the display unit 3 to request that the operator enter the password for the storage unit 20.

Subsequent steps 1603 to 1606 and 1610 correspond to the steps 1403 to 1406 and 1410 described with reference to FIG. 14, and are therefore summarized. When the password is received, the program proceeds to a step 1607 where the received password is compared with the unique password that has been registered in advance in the memory of the PC 1. In a step 1608, the PC 1 then determines whether or not the password that is received is in agreement with the registered password. If they are in agreement, the routine proceeds to a step 1609 permitting the use of the storage unit 20 that is inserted in the device bay 2B. In step 1608, on the other hand, if no registered password is received, the routine proceeds to a step 1611 where the storage unit 20 is unlocked and is forcibly discharged from the device bay 2B.

If no password is received during step 1603 and even after displaying the message five times by executing steps 1604 and 1605, the routine proceeds to step 1611 after having cleared the counter N at the step 1610. At step 1611, the storage unit 20 is unlocked and is forcibly discharged from the device bay 2B.

With this procedure, peripheral equipment, other than the one registered in advance with the PC 1, is forcibly discharged from the device bay 2B despite being inserted in the device bay. Therefore, security is maintained without permitting a person other than an authorized user to use the PC by inserting peripheral equipment in the device bay 2B.

Although the above-mentioned embodiment has described the storage unit as the peripheral equipment, it should be noted that any type of peripheral equipment can be used for this security procedure.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A storage unit detachably connected to host equipment in a computer system and for holding an ejectable storage medium, comprising:
    a connection detector for detecting whether the storage unit is connected to the host equipment;
    a storage medium detector for detecting the presence of the storage medium within the storage unit;
    an automatic medium ejection mechanism for automatically ejecting the storage medium upon receiving a medium discharge instruction; and
    a medium ejection instructor which sends a medium ejection instruction to said automatic medium ejection mechanism upon receiving information that indicates that the storage unit might be moved;
    wherein said information includes an indication that said connection detector detects that the storage unit is disconnected from the host equipment while said storage medium detector detects that the storage medium is located in the storage unit;
    wherein the ejection of the storage medium from the storage unit prevents possible damage caused by the storage medium colliding with internal components of the storage unit while the storage unit is being moved.

2. A storage unit according to claim 1, wherein the storage unit is further provided with an operation setter for setting said medium ejection instructor on or off so that when said operation setter is off, no medium ejection instruction is sent from said medium ejection instructor to said automatic medium ejector regardless of what is included in said information.

3. A storage unit according to claim 1, further comprising:
    a connector for connecting the storage unit to the host equipment; and
    a signal detector for detecting a setting signal that is input to the storage unit through said connector to set said medium ejection instructor on or off so that when said signal detector detects that said setting signal instructs that said medium ejection instructor is to be turned off, no medium ejection instruction is sent from said medium ejection instruction means to said automatic medium ejection mechanism regardless of what is included in said information.

4. A storage unit according to claim 1, wherein the storage unit is further provided with an indicator means for indicating that the storage medium is being ejected by said automatic medium ejection mechanism.

5. A storage unit according to claim 1, wherein the host equipment further includes a device bay for holding the storage unit, and wherein said information includes an indication that the host equipment is going to discharge the storage unit from said device bay while said storage medium detector detects the storage medium is inserted in the storage unit.

6. A storage unit according to claim 5, further comprising:
    a discharge signal detector for detecting a storage unit discharge instruction signal transmitted by the host equipment when the host equipment is going to discharge the storage unit from said device bay,
    said medium ejection instructor sending said medium ejection instruction to said automatic medium ejection mechanism when said discharge signal detector has detected said storage unit discharge instruction signal while said storage medium detector detects that the storage medium is inserted in the storage unit.

7. A storage unit according to claim 5, further comprising;
    a battery; and
    a power source supplying power to the storage unit through said host equipment; and
    wherein said medium ejection instructor and said automatic medium ejection mechanism are driven by said battery, and the storage medium is automatically ejected from the storage unit regardless of the presence of the supply of electric power from the host equipment.

8. A storage unit according to claim 5, comprising:
    a discharge signal detector for detecting a storage unit discharge instruction signal transmitted by the host equipment when the host equipment is going to discharge the storage unit from said device bay;
    a password request message sender for sending a signal to the host equipment through said device bay for displaying a message on the display unit of the host equipment when said discharge signal detector has detected said storage unit discharge instruction signal requesting the input of a password;
    a password comparator means for comparing said password that is input with a password that has been stored in advance in the storage unit; and
    a unit-discharge-permission-signal sender for sending a signal to said host equipment through said device bay permitting the discharge of the storage unit when said passwords are in agreement.

9. The storage unit according to claim 1 further comprising:
    a power source;
    a power switch for turning the power on and off; and
    a power detector for detecting an on/off state of said power source;
    wherein said power information includes an indication that said power detector detects that said power switch has been turned to an off position while said storage medium detector detects that the storage medium is located in the storage unit.

10. A storage unit according to claim 9 further comprising an end instruction detecting means for detecting said end instruction and informing said medium ejection instructor when said end instruction is detected.

11. A storage unit according to claim 1, wherein said information includes an end instruction indicating the end of use of the storage unit while said storage medium detector detects the presence of the storage medium in the storage unit.

12. A storage unit according to claim 11, further comprising:
- a start instruction detector for detecting an instruction indicating the start of use of the storage unit; and
- an indicator means for indicating said start instruction detected by said start instruction detector;
- wherein said indicator changes the indication when said end instruction is detected by said end instruction detector.

13. A storage unit detachably connected to host equipment in a computer system and for holding an ejectable storage medium, comprising:
- a connection detector for detecting whether the storage unit is connected to the host equipment;
- a storage medium detector for detecting the presence of the storage medium within the storage unit;
- an automatic medium ejection mechanism for automatically ejecting the storage medium upon receiving a medium discharge instruction;
- a medium ejection instructor which sends a medium ejection instruction to said automatic medium ejection mechanism upon receiving information that indicates that the storage unit might be moved;
- wherein the ejection of the storage medium from the storage unit prevents possible damage caused by the storage medium colliding with internal components of the storage unit while the storage unit is being moved;
- wherein the storage unit is further provided with an indicator means for indicating that the storage medium is being ejected by said automatic medium ejection mechanism;
- a discharge signal detector for detecting a storage unit discharge instruction signal transmitted by the host equipment when the host equipment is going to discharge the storage unit from said device bay; and
- an alarm message sender which sends a signal for displaying an alarm message to a display unit of said host equipment when said discharge signal detector has detected said storage unit discharge instruction signal while said storage medium detector detects that the storage medium is inserted in the storage unit.

14. A storage unit detachably connected to host equipment in a computer system and for holding an ejectable storage medium, comprising:
- a connection detector for detecting whether the storage unit is connected to the host equipment;
- a storage medium detector for detecting the presence of the storage medium within the storage unit;
- an automatic medium ejection mechanism for automatically ejecting the storage medium upon receiving a medium discharge instruction;
- a medium ejection instructor which sends a medium ejection instruction to said automatic medium ejection mechanism upon receiving information that indicates that the storage unit might be moved;
- wherein the ejection of the storage medium from the storage unit prevents possible damage caused by the storage medium colliding with internal components of the storage unit while the storage unit is being moved;
- wherein the host equipment further includes a device bay for holding the storage unit, and wherein said information includes an indication that the host equipment is going to discharge the storage unit from said device bay while said storage medium detector detects the storage medium is inserted in the storage unit;
- a discharge signal detector for detecting a storage unit discharge instruction signal transmitted by the host equipment when the host equipment is going to discharge the storage unit from said device bay; and
- a query message sender which sends a signal for displaying a query message on a display unit of said host equipment when said discharge signal detector has detected said storage unit discharge instruction signal while said storage medium detector detects that the storage medium is inserted in the storage unit, said query message asking whether or not the storage medium should be ejected before the storage unit is discharged from said device bay.

* * * * *